United States Patent [19]

Saurenman

[11] 4,250,804
[45] Feb. 17, 1981

[54] ION ENHANCED SMOKE TREATMENT OF EDIBLES

[75] Inventor: Donald G. Saurenman, Whittier, Calif.

[73] Assignee: Consan Pacific Incorporated, Whittier, Calif.

[21] Appl. No.: 13,786

[22] Filed: Feb. 21, 1979

Related U.S. Application Data

[63] Continuation-in-part of Ser. No. 893,003, Apr. 3, 1978, abandoned.

[51] Int. Cl.³ ............................ A23L 3/32; A23B 4/04
[52] U.S. Cl. ........................................ 99/451; 99/475; 99/477; 99/481
[58] Field of Search ............... 99/451, 473–476, 99/477, 481; 426/235, 236, 314, 315

[56] References Cited

U.S. PATENT DOCUMENTS

| 1,480,573 | 1/1924 | Smith .................................. 99/451 |
| 2,043,217 | 6/1936 | Yaglou . |
| 2,231,324 | 2/1941 | Cromfton, Jr. . |
| 2,264,495 | 12/1941 | Wilner . |
| 2,565,454 | 8/1951 | MacKenzie et al. ................. 99/451 |
| 2,585,799 | 2/1952 | Lawrence . |
| 2,641,804 | 6/1953 | Klein . |
| 2,765,975 | 10/1956 | Lindenblad . |
| 2,844,478 | 7/1958 | Hanley et al. ...................... 426/235 |
| 3,106,884 | 10/1963 | Dalve et al. ........................ 99/451 |
| 3,203,809 | 8/1965 | Visness et al. ..................... 99/451 |
| 3,288,054 | 11/1966 | Weprin et al. ..................... 99/451 |
| 3,308,344 | 3/1967 | Smith et al. . |
| 3,311,108 | 3/1967 | Cristofv et al. . |
| 3,324,515 | 6/1967 | West . |
| 3,358,289 | 12/1967 | Lee . |
| 3,396,703 | 8/1968 | Trussell . |
| 3,483,672 | 12/1969 | Jahnke . |
| 3,757,491 | 9/1973 | Gourdine . |
| 3,818,269 | 6/1974 | Stark . |
| 4,072,762 | 2/1978 | Rhodes ............................... 99/451 |

FOREIGN PATENT DOCUMENTS 1028351 5/1966 United Kingdom .

Primary Examiner—Harvey C. Hornsby
Assistant Examiner—Timothy F. Simone
Attorney, Agent, or Firm—William W. Haefliger

[57] ABSTRACT

Smoke treatment of edibles such as meat is enhanced by use of electrically charged ions.

12 Claims, 10 Drawing Figures

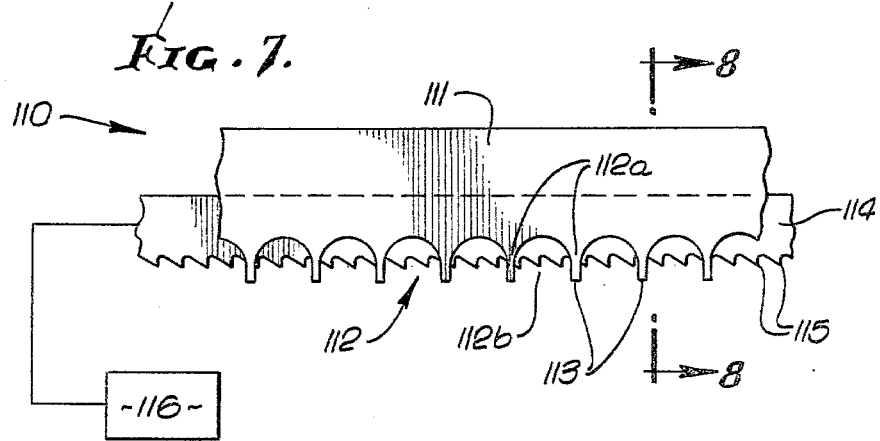
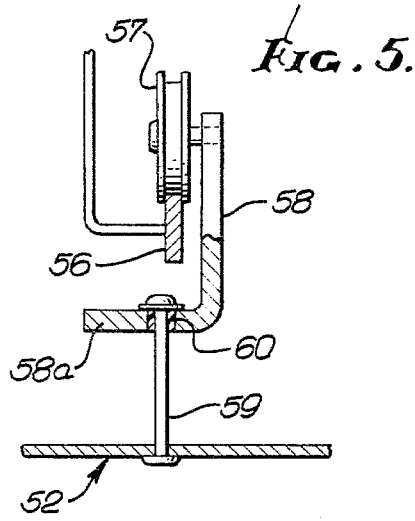
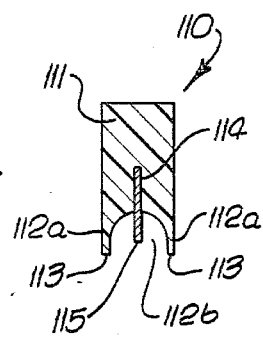
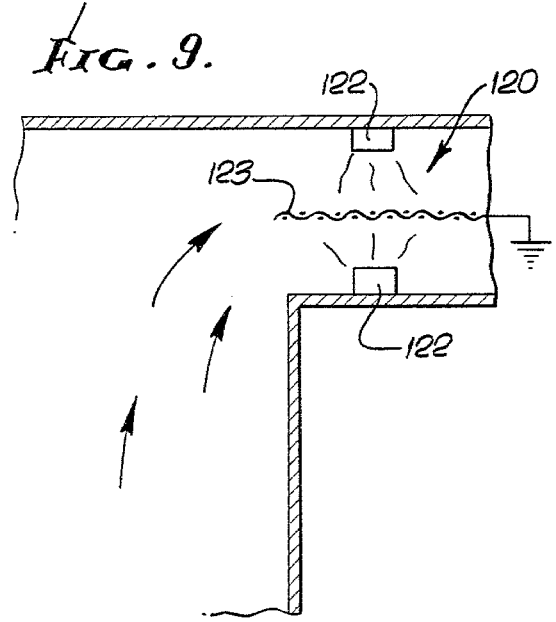
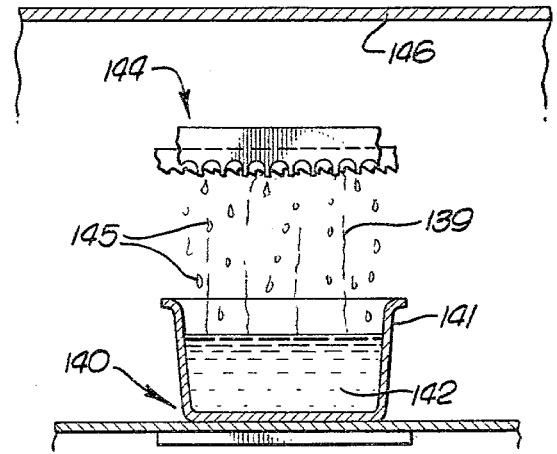

ION ENHANCED SMOKE TREATMENT OF EDIBLES

This application is a continuation-in-part of my prior application, Ser. No. 893,003, filed Apr. 3, 1978, abandoned.

BACKGROUND OF THE INVENTION

This invention relates generally to smoke treatment of edibles, such as meat, and more particularly concerns method and apparatus to more efficiently effect such smoke treatment.

There are certain objections and disadvantages associated with conventional smoke treatment of consumables such as meat. Among these are the length of curing time required for adequate exposure of the meat to the smoke which fills the enclosure wherein the meat is supported; the cost of hardwood or other fuel required to produce such smoke; and the pollution of the outside air to which the smoke is vented. While certain proposals have been made toward alleviating these problems, none to my knowledge has provided the unusual advantages associated with the present invention, as will appear. Among these are reduced smoke exposure time; reduced smoke and fuel requirements; greatly reduced pollution; and great simplicity of use.

SUMMARY OF THE INVENTION

It is a major object of the invention to provide method and apparatus which will alleviate the described problems, as well as provide the referenced advantage. The basic method of the invention includes the steps:

(a) supporting the edible on a support in a smoke zone, and (b) dispersing charged ions into the smoke with the ions carrying an electrical charge of a polarity causing smoke particles to be attracted to the edible, and (c) maintaining the edible at an electrical potential aiding attraction of the smoke particles to the edible.

Since the smoke particles are attracted to the edible, such as meat, less smoke and fuel are required, and less exposure time is needed. Also there is less smoke pollution of air released from the smoke zone.

As will be seen, negatively charged ions are typically dispersed into the smoke, and the meat typically has an initial charge more positive than that of the ions; the meat may be electrically grounded or positively charged; the ions may be dispersed into flowing streams of smoke; and the smoke may be caused to circulate.

Further objects include the provision of an elongated or extended means to dispense ions, and which is usable along walls, ceilings, etc; and the dispensing of ions into vapor rising from edibles or cooking zones to prevent vapor collection on surfaces and drip back into the cooking zone or onto the edibles.

These and other objects and advantages of the invention, as well as the details of illustrative embodiments, will be more fully understood from the following description and drawings, in which:

DRAWING DESCRIPTION

FIG. 5 is an enlarged section on lines 5—5 of FIG. 4;

FIG. 7 is a side elevational view of another form of ion dispenser;

FIG. 8 is a vertical section taken on lines 8—8 of FIG. 7;

FIG. 9 is a fragmentary view of a smoke house outlet, with provision for entrapment of smoke particles; and FIG. 10 is a view showing prevention of steam collection on a ceiling above a cooking or chilling area.

DETAILED DESCRIPTION

Figure 1:
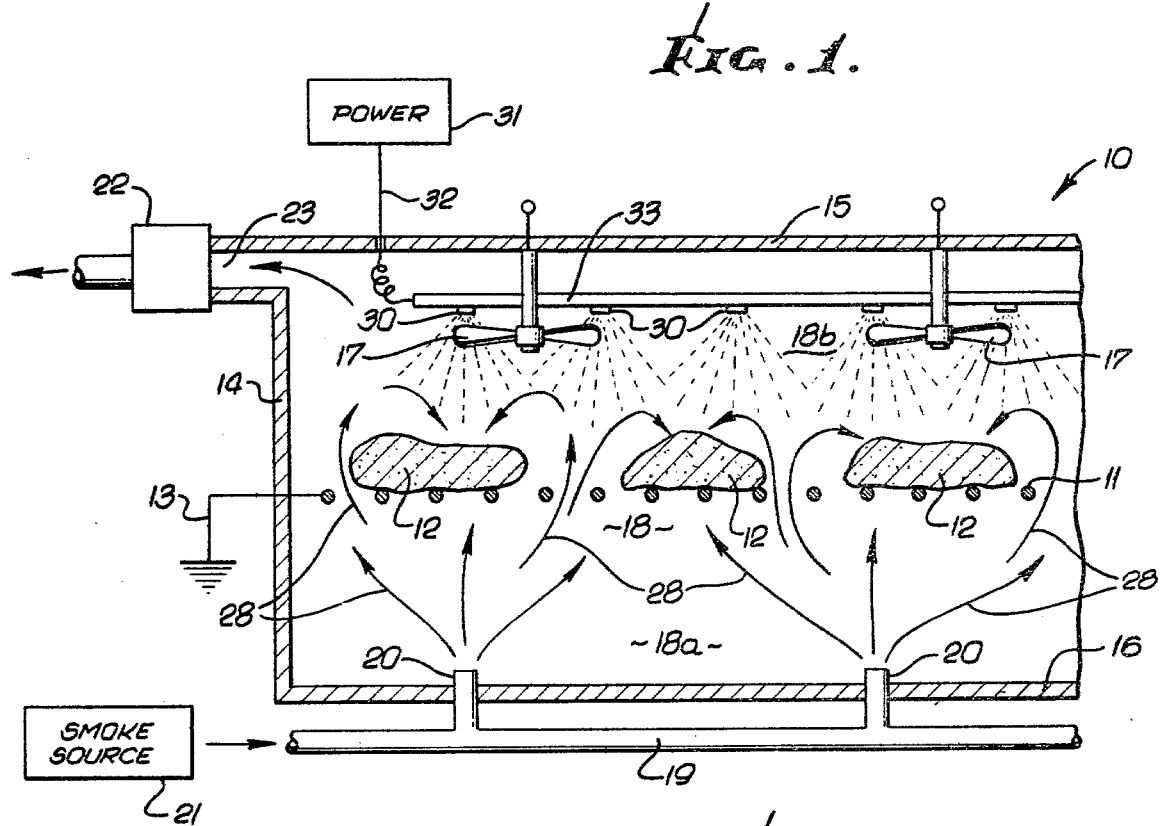
FIG. 1 is a side elevation of a smoke house interior.

In FIG. 1, a smoke house or enclosure 10 contains a support such as a metallic rack or grate 11 on which bodies of meat (or other consumables) 12 are supported. The rack may be suitably electrically grounded, as indicated at 13; alternately, the smoke house walls 14 may be grounded, and the metallic rack or grate connected to such walls. The house also typically includes a roof 15 and a floor 16, and fans 17 may be located in the interior zone 18 to cause smoke to thoroughly circulate about the meat bodies for intimate contact therewith.

Smoke may be delivered to the interior 18 as via a duct 19 with outlets 20 spaced along the floor, i.e. beneath the rack 11, so that smoke rises under and toward the meat. A suitable smoke source is indicated at 21, connected with duct 19. Outlet 23 from zone 18 serves to deliver excess smoke to the exterior via damper valve 22. In the past, such excess smoke escape was considered objectionable, as constituting a source of pollution, as well as a cost item.

In accordance with the invention, electrically charged ions are dispersed or dispensed into the smoke particles, with the ion charge causing the smoke particles to be attracted onto the consumables or edibles, such as the meat. In this regard, the ions typically carry negative charge, which is imparted to the smoke particles causing them to be attracted to the meat, the latter initially having an electrical charge or charges which is or are more positive than that of the dispersed ions. Thus, for example, the meat may be effectively grounded because of its contact with grounded grate or rack 11.

In FIG. 1, the smoke is dispersed into a lower region 18a of zone 18 below the edibles, to rise in currents 28 (as induced by fans 17) against the undersides of the meat bodies, and between the meat bodies, into the upper region 18b of zone 18 whereby the ions are dispersed. As a result, the smoke particles in zone 18b then are attracted back downwardly toward and onto the meat, whereby the meat becomes effectively smoke treated much more rapidly than in the past where ion treatment was not employed.

The means to disperse charged ions into the smoke is shown to include ion dispensers 30 spaced generally horizontally and in upper zone 18b above the meat. Such dispensers may include multiple tips, as for example are disclosed in my U.S. Pat. No. 3,976,916 issued Aug. 24, 1976. A power source at 31 for delivering high voltage to the tips or needles may be as disclosed in U.S. Pat. No. 3,308,344. Between 2,000 and 50,000 volts DC are typically applied to the tips, as via a cable 32 that extends through conduit 33.

Inasmuch as the smoke particles are attracted to the meat or edibles, very little if any excess smoke requires venting at outlet 23, smoke pollution is effectively eliminated, and minimum smoke is required, saving expense. Also, the smoke treatment time for the edibles is minimized.

Figure 2:
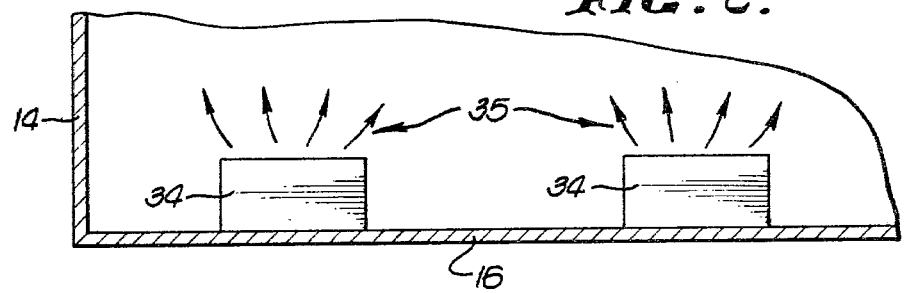
FIG. 2 is a side elevation of a modified lower portion of the FIG. 1 smoke house interior.

In FIG. 2, the smoke source is shown to comprise wood chips above burners, each burner and chip unit being indicated at 34. Rising smoke is indicated at 35.

Figure 3:
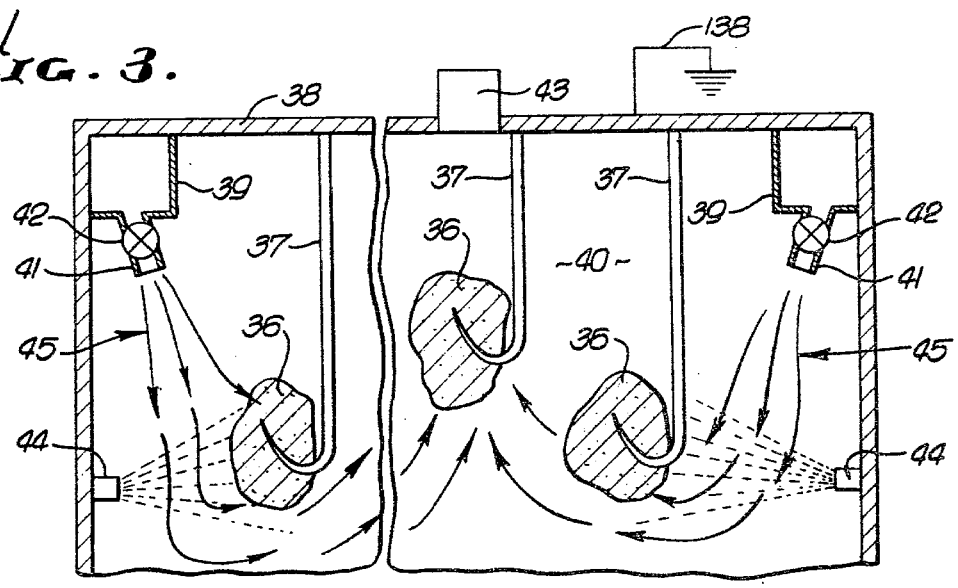
FIG. 3 is a side elevation of a further modification of a smoke house interior.

In FIG. 3, the meat 36 is suspended by metal hooks and bars, indicated generally at 37. These are suspended from the metallic ceiling 38, grounded at 138.

Smoke is delivered via flues 39 at multiple locations as for example the opposite upper corners of the interior zone 40. The flues have outlets at 41, which are valve damper controlled as at 42. A vent appears at 43. The two dampers may, if desired, be alternately opened, to achieve smoke flow in opposite directions across the interior 40, for treatment of the meat.

The ion dispensers 44 are located lower than the flues so as to dispense ions into the smoke currents indicated as flowing downwardly and sidewardly at 45, generally toward the hook suspended meat. Accordingly, the smoke particles become negatively charged, and are attracted toward the meat.

Further in accordance with the invention, either negative or positive ions may be produced to be dispersed as described. Also, negative ions may first be dispersed to negatively charge the edibles. Then, positive ions may be dispersed to attract the smoke onto the negatively charged edibles. The reverse may also be done.

Figure 4:
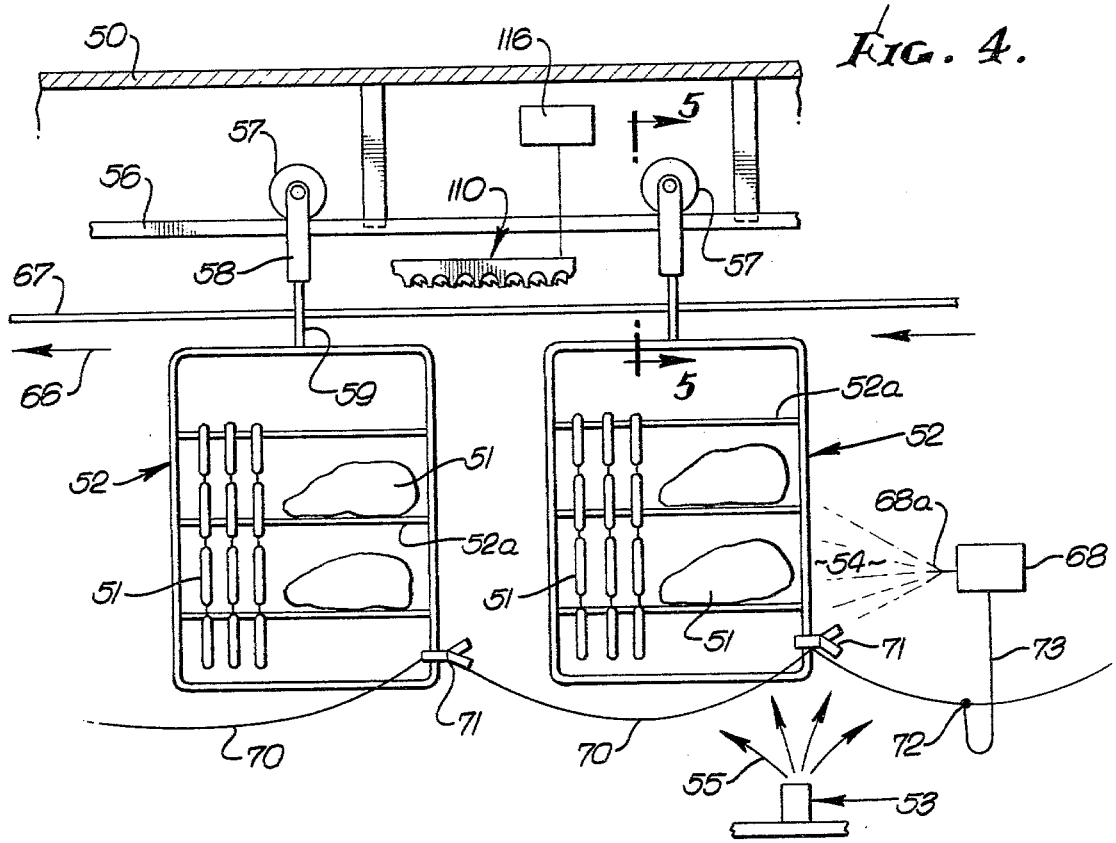
FIG. 4 is a side elevation of a modified ion treatment and edible grounding arrangement.

Referring to FIG. 4, smoke house or enclosure 50 contains means supporting multiple edibles 51, such as meat for example. The support means is shown as a metallic carriage 52 with metal supports 52a for the edibles. Smoke source 53 delivers liquid smoke, or smoke from a wood chip or sawdust or other fire, to the carriage traverse zone 54, arrows 55 indicating such delivery. Smoke may be produced outside the smoke house and then blown into the smoke house. The support means is shown as movably supported on a rail 56, and for that purpose wheels or rollers 57 move along the rail, and support brackets 58 which extend under the rail at 58a. Upward extensions 59 of the carriages extend through insulative tubular fittings 60. The latter extend vertically through the bracket extensions 58a, and support the carriage extensions, as shown. Therefore, the carriages are electrically insulated from the rail 56. As another alternative, the rail 56 may be electrically insulated from its support structure. These are examples, only. Means to advance the supports 52 to the left, as indicated by arrows 66, may include a pull line 67 attached to the supports, or other means.

Means is provided to disperse charged ions into the smoke and into zone 54, with the ions carrying an electrical charge of a polarity causing smoke particles to be attracted to the edibles. Such means is indicated at 68, and may take the form of the devices 30 or 44 previously described. The ion dispensing needles appear at 68a. The emitters may be at or near the floor, or at various levels above the floor.

Means is also provided for maintaining the edibles at an electrical potential or potentials aiding attraction of the smoke particles to the edibles, for enhancing efficiency of smoke deposition, whereby less smoke delivery is needed (less smoke is wasted), the exposure time duration of the edibles to the smoke streams is reduced; and less pollution of air escaping to the interior results. Such means, in FIG. 4, takes the form of structure electrically grounding the edibles, as via the supports 52 for example. Thus, an electrically conductive metallic cable 70 is advantageously employed, and is clipped into firm contact with the metallic supports 52 via alligator clips 71. The cable itself travels along with the supports by virtue of its suspension therefrom, and it may be grounded as by connection at 72 to a slack return line 73 connected to the return or "ground" terminal of the circuitry 68. The latter terminal is typically positive if the ions dispensed are of negative polarity. Line 73 is slack so as to be free to travel with cable 70 as the latter travels along its looping path. Other type ground connections to cable 70 may be employed.

Figure 6:
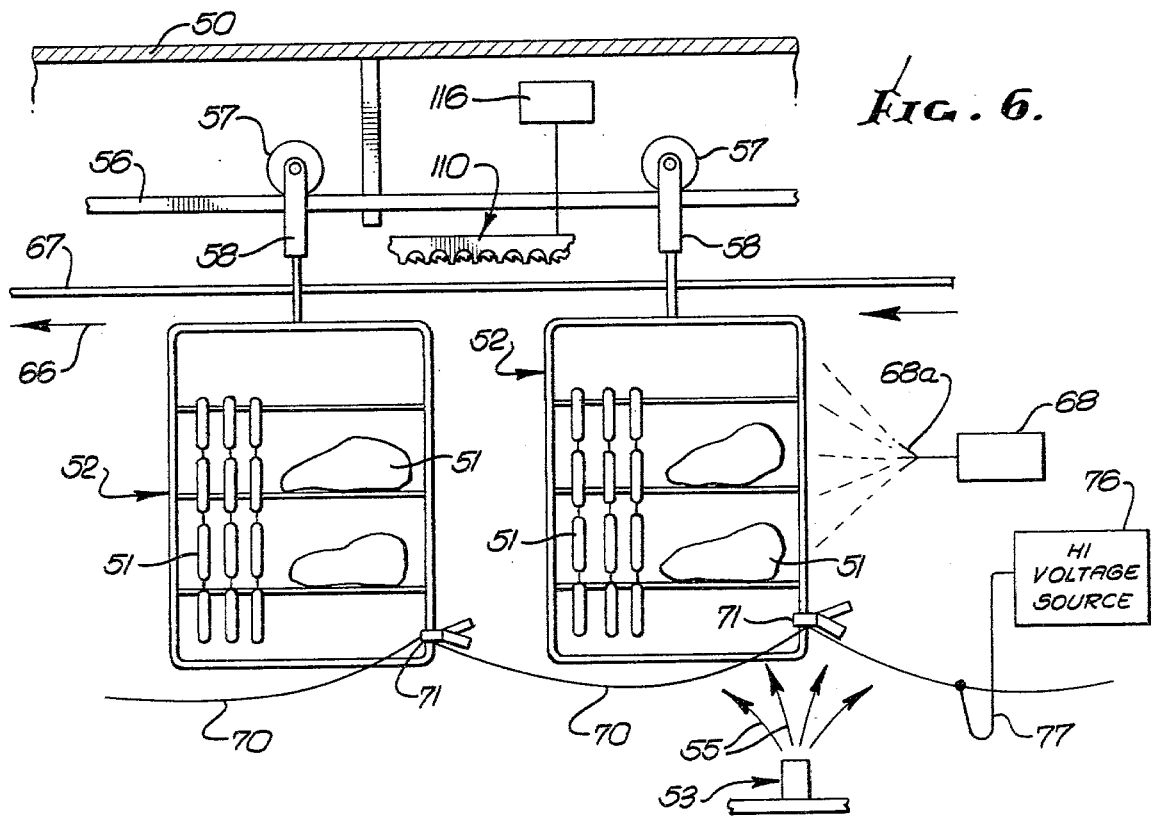
FIG. 6 is a side elevation of yet another ion treatment and edible charging arrangement.

FIG. 6 is like FIG. 4, and to that extent it employs the same identifying numerals. Of difference in FIG. 6 is the employing of circuitry 76 electrically connected to the edible (as via slack line 77, cable 70 and supports 52) to impart an electrical charge thereto, of a polarity opposite to that of the ions, to aid attraction of the charged smoke particles to the meat or edibles. Thus, a charge or potential between 2,000 and 50,000 volts is typically used, and preferably about 14,000 to 19,000 volts produces best results for meat. That voltage is positive when the ions are of negative polarity.

Any of various well known circuits may be used to provide the high voltage of source 76.

Examples of meat bodies and other edibles to be smoked are sausage, pork, ham, frankfurters, bacon, beef, chicken, turkey, fish, etc., others also being treatable.

The invention reduces the amount of wood smoke required on the product, and thereby reduces the bitter taste caused by tar and reduces possible cancer forming agents deposited on the product by smoke. Also, smoke pollution near smoke houses is reduced, and the need for pollution control equipment is thereby reduced.

FIGS. 4, 7 and 8 also illustrate an alternative or auxiliary means 110 for dispersing charged ions into the smoke, the ions carrying an electrical charge of a polarity causing smoke particles to be attracted to the edible. As shown in FIGS. 7 and 8, the means 110 includes an elongated insulative plastic strip 111 defining a groove or channel 112 which opens at one side direction, facing away from the strip. The flanges 112a of the channel contain multiple side opening 112b, separated by protective prongs 113 which are closely spaced to prevent finger entry into the channel. A narrow electrical conductive metallic strip 114 is originally mounted to the strip 111 to project into the channel, as shown. The strip 114 is serrated to define multiple pointed tips 115 exposed in the channel, to dispense positive or negatively charged ions when the strip is electrically charged by high voltage source 116, corresponding to sources 68 or 76. Serrated strip 114 may take the form of a metallic saw blade, which is gold plated for electrical conductivity.

In FIG. 4, the means 110 is directed downwardly toward the carriages 52 and edibles 51. Therefore, vapor or steam particles rising from the edibles are caused to coalesce by virtue of dispensed ion contact therewith, to drop down to the floor of the smoke house. This prevents vapor collection or condensation on the ceiling of the smoke house and subsequent dripping down onto the edibles which is highly objectionable as being unsanitary. Accordingly, the means 110 serves two functions, i.e. prevention of drip from the ceiling, and also causing attraction of smoke particles of the edibles, as described.

FIG. 9 shows an arrangement to prevent remanent smoke escape to the exterior via outlet or flue 120 from the smoke house. Smoke passing into the flue, as indicated by arrows 121 is subjected to contact with charged ions dispensed by devices 122 above and below a grounded screen 123. Therefore, the charged ions and smoke particles are then attracted to screen 123, preventing their escape. A smoke house may then be cleared of remanent smoke without producing external pollution, and so that the edible supports or racks may be accessed for edible removal or rack cleaning.

In FIG. 10, vapor or steam 139 rising from a chill or cook area 140 (as for example a pot 141 of boiling liquid 142) is prevented from reaching ceiling by means 144 the same as described above at 110. Coalesced steam droplets 145 drop back down, by gravity, preventing steam reaching the ceiling 146, and thus preventing resultant drip from the ceiling.

I claim:

1. In apparatus for enhancing smoke treatment of edibles, the combination comprising
   (a) first means for dispersing smoke particles in a zone wherein the edibles are located, and means for inducing smoke particle flow to contact exposed undersides of the edibles, and to flow around and above the edibles,
   (b) other means including a source of high voltage and multiple pointed tips to which said voltage is applied for dispersing charged ions into the smoke flowing upwardly above the edibles with the ions carrying an electrical charge or charges causing smoke particles to be attracted back downwardly onto upper sides of the edibles,
   (c) and metallic structure having local contact with exposed underside portions of the edibles, said structure imparting a potential to the edibles to cause said smoke particles into which ions have been dispersed to be attracted to the upper sides of the edibles,
   (d) said tips arranged in spaced apart clusters and pointed toward the edibles so that the ions being dispersed enhance smoke particle flow onto the edibles,
   (e) said metallic structure including metallic grid structure supporting the edibles, the grid structure being electrically conductive, and
   (f) the smoke being dispersed by said first means into a lower region of said zone lower than the edibles, and the ions are dispersed by said tips into an upper region of said zone higher than the edibles, said smoke particle flow inducing means located in and openly exposed in said zone to displace the smoke and ions above the levels of the edibles, and in a direction and at a rate sufficient to enhance smoke particle flow onto the edibles.

2. The combination of claim 1 wherein the edibles are supported by said metallic structure serving to effectively ground the edibles.

3. The combination of claim 1 including means confining said zone, and certain of said smoke is caused by said tips to flow generally downwardly and onto the edibles after the smoke has been caused to flow upwardly about the edibles.

4. The apparatus of claim 1 comprising other means including an elongated cable for maintaining the edibles at an electrical potential aiding attraction of the smoke particles to the edibles, said cable connected to said metallic structure to be movable therewith.

5. The apparatus of claim 4 wherein said other means includes structure electrically grounding the edibles via said cable.

6. The apparatus of claim 4 wherein said other means includes structure attaching the cable to said metallic structure and electrically grounding the metallic structure which is electrically conductive.

7. The apparatus of claim 6 wherein the metallic structure is supported on a rail and is electrically insulated from the rail.

8. The apparatus of claim 6 wherein the metallic structure is supported on a rail which is itself supported by fixed support structure, and said rail is electrically insulated from said fixed support structure.

9. The apparatus of claim 6 wherein said metallic structure includes multiple metallic supports for multiple edibles, the cable connected to said supports, the supports individually supported by a rail to be individually movable therealong.

10. The apparatus of claim 4 wherein said source of high voltage includes circuitry electrically connected to the edibles to impart an electrical charge thereto of a polarity opposite to that of said ions.

11. The apparatus of claim 10 wherein there are multiple of said edibles, said metallic structure includes individually movable multiple supports for said edibles, said cable connected to said supports and to said circuitry.

12. The apparatus of claim 11 wherein said circuitry includes means to supply positive voltage between 2,000 and 50,000 volts to said edibles.

* * * * *